United States Patent [19]
Bresolin

[11] Patent Number: 5,767,606
[45] Date of Patent: Jun. 16, 1998

[54] SYNCHRONOUS ELECTRIC MOTOR, PARTICULARLY FOR SUBMERSIBLE PUMPS, AND PUMP INCLUDING THE MOTOR

[75] Inventor: Valerio Bresolin, Pove Del Grappa, Italy

[73] Assignee: Hydor S.R.L., Bassano Del Grappa, Italy

[21] Appl. No.: 691,417

[22] Filed: Aug. 2, 1996

Related U.S. Application Data

[63] Continuation of Ser. No. 157,989, Nov. 24, 1993, abandoned.

[30] Foreign Application Priority Data

Nov. 27, 1992 [IT] Italy ................... VI92A0181

[51] Int. Cl.$^6$ ............... H02K 1/12; H02K 21/18; H02K 21/14; F01B 23/08
[52] U.S. Cl. ............... 310/254; 310/162; 310/43; 310/87; 417/321
[58] Field of Search ............... 310/43, 87, 88, 310/254, 162; 417/321, 423.7, 423.14, 424.1

[56] References Cited

U.S. PATENT DOCUMENTS

| | | | |
|---|---|---|---|
| 2,025,560 | 12/1935 | Warren | 310/157 |
| 2,119,986 | 6/1938 | Dremel | 310/254 |
| 2,484,001 | 10/1949 | Raymond | 310/254 |
| 3,199,342 | 8/1965 | White | 417/423.14 |
| 3,390,289 | 6/1968 | Duken et al. | 310/42 |
| 3,814,963 | 6/1974 | Laing | 310/254 |
| 3,873,861 | 3/1975 | Halm | 310/43 |
| 4,051,401 | 9/1977 | Hayward | 310/216 |
| 4,350,914 | 9/1982 | Searle | 310/43 |
| 4,503,346 | 3/1985 | Bertram et al. | 310/254 |
| 4,554,471 | 11/1985 | Bertram et al. | 310/254 |
| 4,565,955 | 1/1986 | Kubota | 310/162 |
| 4,684,840 | 8/1987 | Bertram et al. | 310/162 |
| 5,088,902 | 2/1992 | Marioni | 417/415 |

FOREIGN PATENT DOCUMENTS

| | | | |
|---|---|---|---|
| 357913 | 3/1990 | European Pat. Off. | |
| 358805 | 3/1990 | European Pat. Off. | 310/162 |
| 791405 | 12/1935 | France | 310/162 |
| 2265209 | 10/1975 | France | 310/162 |
| 3724219 | 2/1988 | Germany | 310/162 |
| 1-290996 | 11/1989 | Japan | 417/423.7 |
| 220528 | 9/1924 | United Kingdom . | |
| 966156 | 8/1964 | United Kingdom . | |

*Primary Examiner*—Clayton E. Laballe
*Attorney, Agent, or Firm*—Wolf, Greenfield & Sacks, P.C.

[57] ABSTRACT

A synchronous electric motor includes a stator lamination pack (2) provided with at least one electric winding (6, 6') and a rotor (3) wade of a material with high magnetic retentivity. The laminations (4) of the pack (2) are arranged parallel to the axis of the rotor (Z) to limit the transverse dimension of the motor (1). The lamination pack (2) is U-shaped, with straight segments (5, 5') on which windings (6,6') are formed. The axes of their turns are substantially parallel to the axis (Z) of the rotor (3). At the segments (5, 5') the laminations (4) have different heights along a direction (X) which is transverse to the axis (Z) of the rotor (3). The lamination pack (2), together with its windings, is embedded in a matrix (12) of insulating resin, which is in turn enclosed tight within a substantially rigid container (11) made of dielectric material, forming a sealed modular capsule. This capsule can be coupled to rotor units of different types to form submersible pumps.

22 Claims, 2 Drawing Sheets

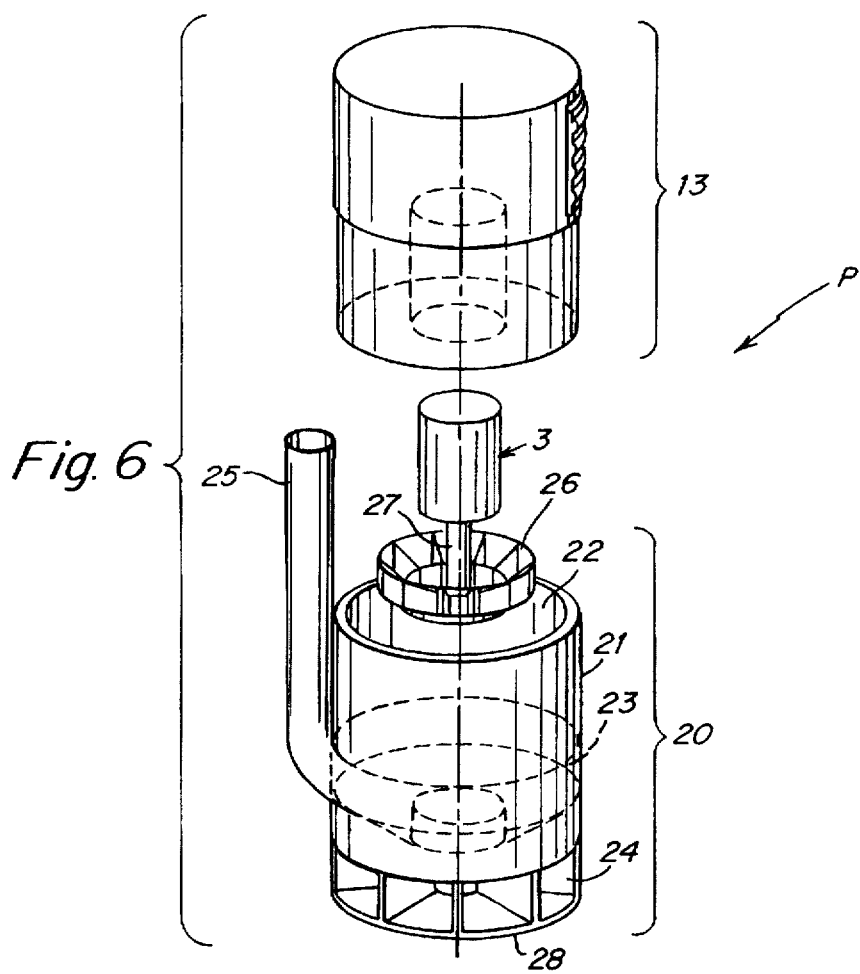
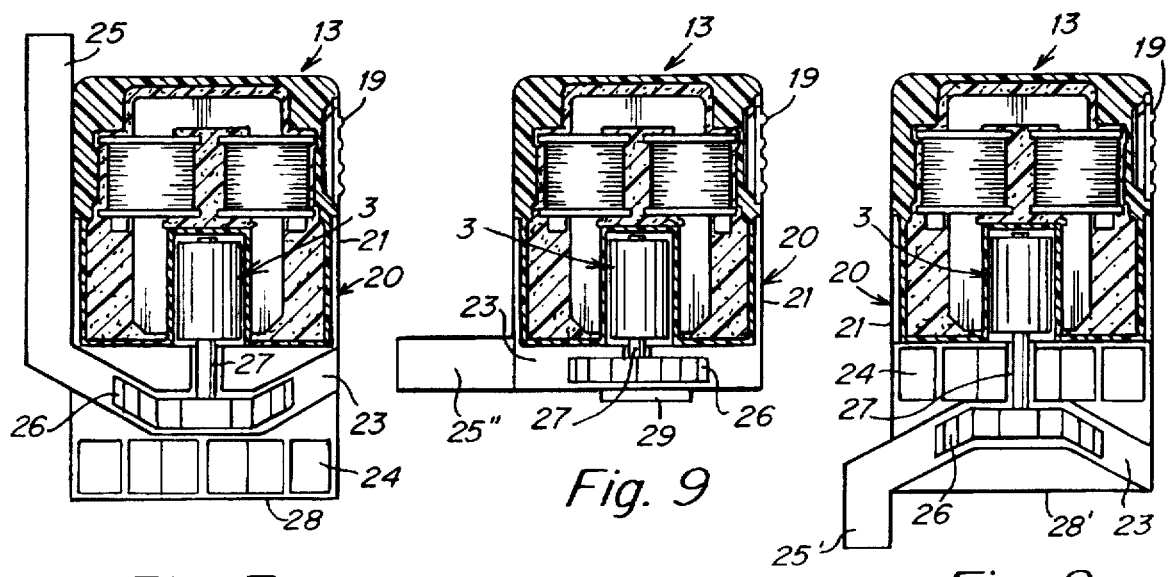

5,767,606

SYNCHRONOUS ELECTRIC MOTOR, PARTICULARLY FOR SUBMERSIBLE PUMPS, AND PUMP INCLUDING THE MOTOR

This application is a continuation of application Ser. No. 08/157,989, filed Nov. 24, 1993 now abandoned.

BACKGROUND OF THE INVENTION

1. Field of the invention

The present invention relates to a synchronous electric motor, particularly but not exclusively for submersible pumps, including a stator lamination pack provided with at least one electric winding and a rotor made of a material with high magnetic retentivity.

The invention equally relates to a modular stator capsule particularly for electric motors of the above described type, and to a series of submersible pumps actuated by these motors.

In particular, submersible pumps according to the invention can be applied in several industrial and household applications, for example for recirculating the water in aquariums or ornamental tanks or for pumping dangerous liquids contained in cans, drums or tanks in general.

2. Description of the Prior Art

As is known, all synchronous electric motors have the property of maintaining a constant speed if the applied loads vary, and small motors are characterized by a low manufacturing cost.

Constructively, they include a fixed part, or stator, that supports the electric windings, and a rotor provided with permanent magnets.

The stator is formed by a pack of laminations made of ferromagnetic material which are generally C-shaped with parallel segments provided with electric windings for generating the magnetic field. The rotor is arranged between the parallel segments, and its rotation axis is at right angles to the plane of arrangement of the laminations of the pack.

Due to this configuration, devices actuated by these motors have considerable dimensions in at least two mutually perpendicular directions. This is due to the right-angled arrangement of the rotor axis and of the axis of the stator coils, and also to the fact that, in most cases, the rotor axis is parallel to, or coincides with, the main axis of the device.

In particular, submersible pumps driven by such a motor have substantially identical dimensions in three mutually perpendicular directions, because it is never possible to significantly reduce one of these dimensions.

Consequently, these pumps are difficult to insert in containers which have openings with a stall diameter. Their shape is also difficult to conceal, and this is an important drawback for certain applications, such as, for example, in ornamental aquariums or fountains for apartments.

It is known that synchronous electric motors have difficulty in starting due to the symmetry of the magnetic field generated by the stator and by the rotor.

In order to avoid this problem, the stator is configured so as to have asymmetries of its magnetic field that avoid magnetic "stickings" during startup.

Motors meant to be used in submersible pumps must be protected by a double insulation, usually provided by resin-embedding the electric parts, which is not always satisfactory.

A further limitation of known commercially available pumps can be constituted by their poor flexibility and by the lack of modularity of their components, including the electrical ones, and this factor considerably increases production costs and, subsequently, maintenance costs.

The aim of the present invention is to eliminate the drawbacks described above by providing a synchronous electric motor having a predominantly axial extension, such as to considerably reduce space occupation in a transverse direction.

An object is to provide a modular stator assembly for the manufacture of synchronous motors of absolute reliability and insulation.

A further object is to provide submersible pumps having a predominantly axial extension with various configurations, characterized by extreme flexibility, easy assembly and economy.

SUMMARY OF THE INVENTION

This aim and these objects are achieved, according to the invention, by a synchronous electric motor as claimed in the appended claims.

The lamination pack is generally U-shaped with substantially straight and parallel segments. On at least one segment the lamination pack has an electric winding in which the turn axis is substantially parallel to the rotor axis.

The laminations of the stator pack also have, along the parallel segments, widths which differ continuously or discontinuously along a transverse direction with respect to the rotor axis to substantially follow the curvature of the rotor.

Along the internal profile of the parallel segments, the laminations of the pack have a recess suitable to locally reduce the axial component of the magnetic flux.

Conveniently, the stator lamination pack, together with its windings, is fully embedded in a block of insulating resin which is in turn enclosed tight within a substantially rigid container made of dielectric material, so as to form a modular and interchangeable capsule.

At an axial end, this container has a cylindrical recess that extends between the parallel segments of the pack and is sized so as to accommodate the rotor. At the opposite end, the container has a substantially flat wall.

According to a further aspect of the invention, a submersible pump is provided particularly for aquariums. The pump is driven by a synchronous electric motor of the above described type and is characterized in that it includes a modular stator capsule which can be coupled to interchangeable rotor units having different configurations.

Further characteristics and advantages of the invention will become apparent from the detailed description of some preferred but not exclusive embodiments of the motor and of the submersible pump according to the invention, illustrated with the aid of the accompanying drawings.

BRIEF DESCRIPTION OF THE DRAWINGS

FIG. 6 is a general exploded perspective view of a first embodiment of a submersible pump according to the invention which uses the stator capsule illustrated in FIG. 5;

FIG. 7 is a longitudinal sectional view of the pump of FIG. 6;

FIGS. 8 and 9 are sectional views of two alternative embodiments of plumps according to the invention which use the stator capsule of FIG. 5.

DESCRIPTION OF THE PREFERRED EMBODIMENTS OF THE INVENTION

Figure 1:
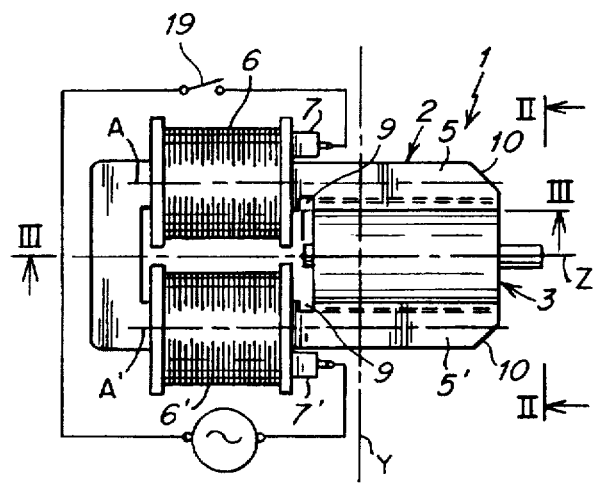
FIG. 1 is a partially sectional side view of a motor and of a stator capsule according to the invention.

With reference to the figures, a synchronous electric motor particularly suitable for operations of submersible pumps is generally designated by the reference numeral 1. Three mutually perpendicular main axes X, Y and Z have been indicated in this motor.

The motor includes a stator assembly 2 and a rotor 3. The stator assembly includes a pack of laminations 4, made of ferromagnetic material which are contained in planes which are parallel to the main plane X-Z, and are substantially U-shaped so as to form parallel segments 5, 5'. Respective electric coils 6, 6' are wound on these segments; the axes A, A' of their turns are substantially parallel to the main axis Z, and the coils have electric terminals 7, 7'.

The ends of the segments that protrude from the coils 6, 6' form the stator poles.

Along the parallel segments 5, 5', the widths of the laminations of the pack in the direction of the axis X vary in the direction of the axis y, so as to produce polar asymmetries in the magnetic flux which are suitable to stop the rotor in preferential positions which are spaced from the magnetic axis and avoid "magnetic sticking" during startup. These steps furthermore substantially follow the curvature of the rotor 3 to contain losses in the air gap improving the efficiency of the motor.

Figure 2A:
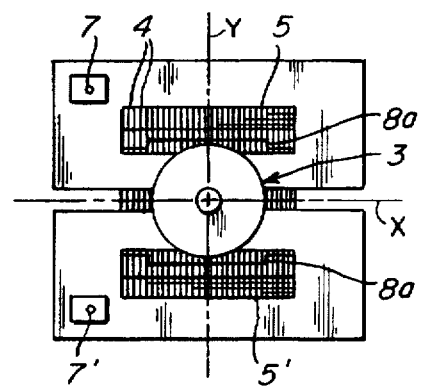
FIGS. 2a and 2b are front sectional views, taken along the plane II—II, of the motor of FIG. 1 in two alternative embodiments.
Figure 3:
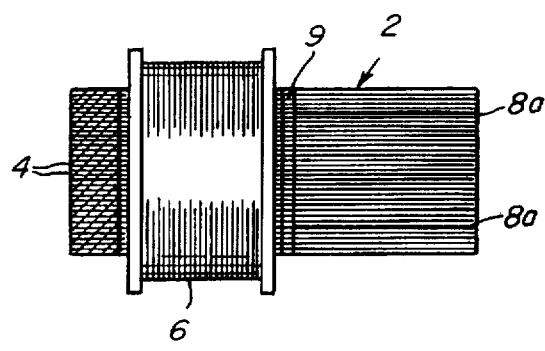
FIG. 3 is a longitudinal sectional view of the motor of FIG. 1, taken along the plane III—III.
Figure 2B:
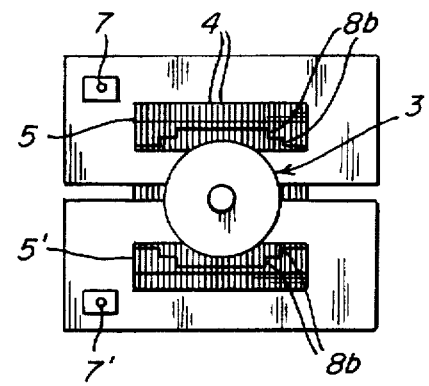
Figure 4:
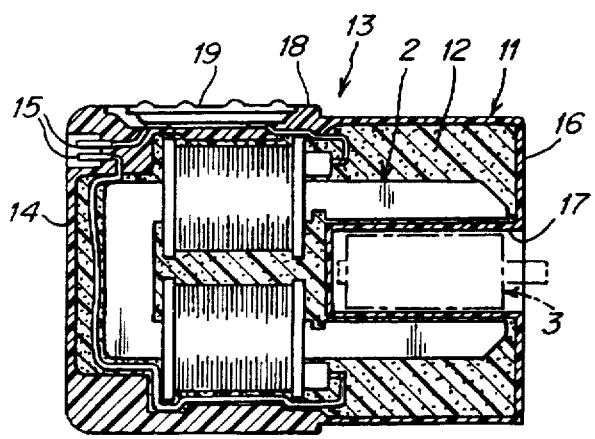
FIG. 4 is a partially sectional side view of a stator capsule which encloses the stator assembly of FIG. 1.
Figure 5:
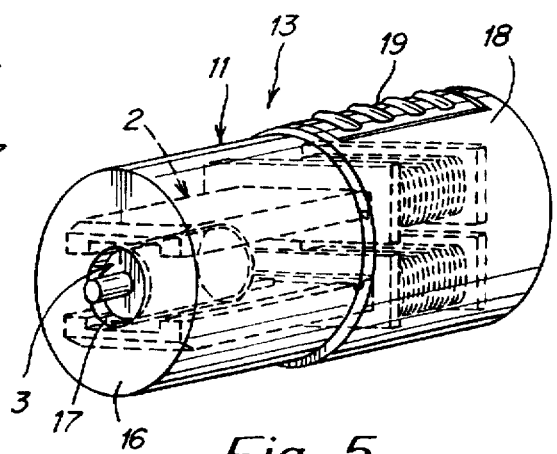
FIG. 5 is a general perspective view of the stator capsule of FIG. 4.

In particular, the laminations 4 are wider toward the lateral regions of the pack which are furthest from the axis Z in the direction of the axis Y, so as to form longitudinal steps on the segments 5, 5' In the embodiment of FIG. 2a there is only one step 8a on each side, whereas two steps 8b on each side are formed in the embodiment of FIG. 2b.

Along the internal profile of the parallel segments and proximate to the coils 6, 6', the laminations 4 also have a recess 9 which has the purpose of creating a pinch in the magnetic flux meant to reduce the axial component of this flux, increasing the radial one.

At the tree ends of the segments 5, 5', the laminations 4 can have chamfers 10 which are arranged at approximately 45° with respect to the axis Z and are suitable to reduce the dimensions of the stator assembly for particular applications which will be described hereinafter.

It is noted that the arrangement of the rotor 3, so that its axis is parallel to the main dimension of the stator assembly, allows to increase the length L of the rotor without increasing the longitudinal dimension of the assembly and fully exploits the intensity of the magnetic flux of the stator.

In this manner it is possible to provide synchronous motors which, power for power, have smaller transverse dimensions, have smaller rotors or electric coils with a smaller number of turns or with a wire of larger diameter than conventional motors It is thus possible to obtain considerable economic advantages, considering that larger diameter enameled electrolytic copper wire has a lower specific cost.

Conveniently, the stator assembly 2 is sealed tight within a container 11 made of a substantially rigid dielectric material, where it is embedded within a matrix of insulating resin 12 so as to form a stator capsule 13.

The container 11 generally has a cylindrical shape with internal dimensions that substantially follow the outer profile of the stator assembly, so as to minimize the amount of insulating resin and consequently the weight and cost of the motor. The end wall 14 of the container is substantially flat and can have electric connectors 15 for supplying power to the motor, whereas the opposite wall 16 has a cylindrical seat 17 meant to accommodate the rotor 3.

A sealed switch 19 can be provided on the side wall 18 of the container 11.

The stator capsule 13 constitutes a modular basic component for producing double-insulated synchronous electric motors The capsule may be rigidly coupled, in a per se known manner, to different rotor units, designated by the reference numeral 20 in FIGS. 6, 7 and 8 and described in detail hereinafter, so as to produce various models of submersible pump P.

With reference to FIGS. 6 and 7, the rotor unit 20 can be formed by an outer shell 21 which has a generally cylindrical shape with an open end 22 for the close-fit insertion of the stator capsule 13 Inside the shell 21 there is a pressure chamber 23 which is connected to an intake grill 24 and to a delivery duct 25. The pressure chamber 23 accommodates an impeller 26 which is keyed on the axis 27 of the rotor 3. In this embodiment, the delivery duct 25 is parallel to the longitudinal axis Z of the pump and is directed opposite to the end wall 28 of the shell 21, forming as a whole a pump model which can be defined as an "axial reversed flow" pump.

The embodiment of FIG. 8 differs from the one shown in FIGS. 6 and 7 in that the delivery duct 25' is always axial but is directed toward the end wall 28', forming a pump model which can be defined as an "axial direct flow" pump.

Finally, in the embodiment illustrated in FIG. 9 there is a radial delivery duct 25" with an axial intake 29, forming a "radial flow" model.

Independently of the particular configuration of the above described pumps, it is evident that the arrangement and coaxial coupling of the rotor unit 20 to the motor 1, and thus also to the stator capsule 13, reduces the size of the pump, which extends predominantly in the direction of the axis Z, with reduced transverse dimensions along the axes X and Y.

This configuration allows to insert the pump 2 in containers provided with small inlet openings, such as for example cans containing dangerous fluids.

A series of submersible pumps driven by coaxial motors according to the invention, particularly suitable for different uses, is manufactured very quickly and according to the indications of the customer by easily assembling the prefabricated modules which include the motor, the stator capsule and the rotor units.

This is a considerable saying for production, and allows considerable flexibility which adapts well to the requirements of the market.

Experimental tests have also shown that the particular arrangement of the rotor coaxially to the stator coils improves the efficiency of the motor and pickup during startup.

By coupling the motor coaxially to a submersible pump it is possible to considerably reduce the transverse size of the pump, allowing to insert it in small-diameter openings or to easily conceal it if there are aesthetic reasons.

A stator capsule according to the invention constitutes a basic module which can be easily applied to different devices, driven by an axially extending synchronous motor according to the invention, allowing extreme flexibility in use and economy in the manufacture of these devices.

I claim:

1. A synchronous electric motor, particularly for submersible pumps, comprising:
   a stator lamination pack having a plurality of laminations and being substantially U-shaped, said stator lamination pack farther having a pair of elements parallel to a stator axis;
   at least one electric winding wound around the stator lamination pack;
   a rotor disposed between the pair of elements of the stator and made of a material with high magnetic retentivity, the rotor having an axis of rotation parallel to the stator axis;
   wherein said elements have free end portions substantially extending along a full length of said rotor;
   wherein the rotor is disposed in a center area between the pair of elements, the laminations have a height perpendicular to the axis of rotation, and the height of the laminations surrounding the center area is reduced, creating a longitudinally stepped cavity in the lamination pack with at least one longitudinal step that contains the rotor; and
   wherein the laminations of the stator lamination pack, including the laminations of the pair of elements and the laminations of the free end portions enclosing the rotor, extend only in a parallel direction with respect to the rotor axis of rotation so as to limit a transverse dimension of the motor perpendicular to the rotor axis.

2. The synchronous electric motor according to claim 1, wherein the at least one electric winding has a turns axis substantially parallel to the rotor axis.

3. The synchronous electric motor according to claim 1, wherein the stator lamination pack has at least one recess in at least one element of the pair of elements, said recess being constructed and arranged to locally reduce an axial component of a magnetic flux.

4. The synchronous electric motor according to claim 3, wherein the stator lamination pack including the free end portions of the elements enclosing the rotor and the at least one electric winding is embedded in a matrix of insulating resin which is in turn enclosed and sealed within a substantially rigid container made of dielectric material.

5. The synchronous electric motor according to claim 4, wherein said container has, at an axial end, a cylindrical cavity which extends between the pair of elements of the lamination pack and is constructed and arranged so as to freely accommodate the rotor, and has, at an end, opposite the axial end, a substantially flat wall.

6. The synchronous electric motor according to claim 1, wherein the rotor is disposed in a center area between the pair of elements, the laminations have a height perpendicular to the axis of rotation, and the height of the laminations surrounding the center area is reduced to create a cavity in the lamination pack for containing the rotor.

7. The synchronous electric motor according to claim 1, wherein the stator lamination pack has at least one recess in at least one element of the pair of elements, said recess being constructed and arranged to locally reduce an axial component of a magnetic flux.

8. The synchronous electric motor according to claim 1, wherein the stator lamination pack and the at least one electric winding is embedded in a matrix of insulating resin which is in turn enclosed and sealed within a substantially rigid container made of dielectric material.

9. A modular stator capsule for axially extending synchronous electric motors, comprising:
   a substantially rigid container made of dielectric material and having a stator pack including magnetizing windings and a pair of elements, said magnetizing windings each having a winding axis and being wound on said pair of elements, each winding axis substantially parallel to a main axis of the stator pack, the stator pack being enclosed and sealed in the container and embedded in a matrix of insulating resin, the substantially rigid container having an axial end with a cylindrical cavity which extends between the pair of elements of the stator pack and is constructed and arranged so as to freely accommodate a rotor having an axis of rotation, the substantially rigid container having a second end opposite the axial end that comprises a substantially flat wall.

10. A submersible pump, particularly for aquariums, comprising:
    a modular stator capsule according to claim 9; and
    an interchangeable rotor unit having a rotor having an axis of rotation, disposed in the cylindrical cavity of the modulator stator capsule.

11. The submersible pump according to claim 10, wherein said rotor unit further includes:
    an impeller;
    an elongated shell having a first end, a second end opposite the first end, and a pressure chamber located toward the first end and constructed and arranged to accommodate the impeller, the second end having an opening for the insertion of said modular stator capsule;
    an intake duct coupled to the pressure chamber; and
    a delivery duct coupled to the pressure chamber.

12. The submersible pump according to claim 11, wherein the delivery duct extends axially toward the cylindrical cavity of the modular stator capsule, so as to form a centrifugal pump with reversed axial flow.

13. The submersible pump according to claim 11, wherein the delivery duct extends axially in an opposite direction with respect to the cylindrical cavity of the modular stator capsule, so as to form a centrifugal pump with direct axial flow.

14. The submersible pump according to claim 11, wherein the delivery duct is directed substantially radially, so as to form a centrifugal pump with radial flow.

15. The modular stator capsule of claim 9, wherein the stator pack is comprised of a plurality of laminations, arranged parallel to the rotor axis.

16. The modular stator pack of claim 10, wherein the laminations have a height in a direction perpendicular to the axis of rotation, and the height of the laminations in an area surrounding the cylindrical cavity is reduced to create a cavity in the lamination pack corresponding to the cylindrical cavity of the substantially rigid container.

17. The submersible pump of claim 10, wherein the stator pack is comprised of a plurality of laminations, arranged parallel to the rotor axis.

18. The submersible pump of claim 17, wherein the laminations have a height in a direction perpendicular to the axis of rotation, and the height of the laminations in an area surrounding the cylindrical cavity is reduced to create cavity in the lamination pack corresponding to the cylindrical cavity of the substantially rigid container.

19. The submersible pump according to claim 18, wherein said rotor unit further includes:
    an impeller;

an elongated shell having a first end, a second end opposite the first end, and a pressure chamber located toward the first end and constructed and arranged to accommodate the impeller, the second end having an opening for the insertion of said modular stator capsule;

an intake duct coupled to the pressure chamber; and a delivery duct coupled to the pressure chamber.

20. The submersible pump according to claim 20, wherein the delivery duct extends axially toward the cylindrical cavity of the modular stator capsule, so as to form a centrifugal pump with reversed axial flow.

21. The submersible pump according to claim 19, wherein the delivery duct extends axially in an opposite direction with respect to the cylindrical cavity of the modular stator capsule, so as to form a centrifugal pump with direct axial flow.

22. The submersible pump according to claim 19, wherein the delivery duct is directed substantially radially, so as to form a centrifugal pump with radial flow.

* * * * *